(12) United States Patent
Youso et al.

(10) Patent No.: US 8,191,528 B2
(45) Date of Patent: Jun. 5, 2012

(54) INTERNAL COMBUSTION ENGINE

(75) Inventors: Takashi Youso, Hiroshima (JP);
Toshiaki Nishimoto, Hiroshimi (JP);
Masahisa Yamakawa, Hiroshima (JP);
Tatsuya Fujikawa, Hiroshima (JP)

(73) Assignee: Mazda Motor Corporation (JP)

( * ) Notice: Subject to any disclaimer, the term of this patent is extended or adjusted under 35 U.S.C. 154(b) by 828 days.

(21) Appl. No.: 12/346,976

(22) Filed: Dec. 31, 2008

(65) Prior Publication Data
US 2009/0173307 A1   Jul. 9, 2009

(30) Foreign Application Priority Data

Jan. 8, 2008   (JP) .................................. 2008-001623

(51) Int. Cl.
*F02F 3/00* (2006.01)
*F02F 1/42* (2006.01)
(52) U.S. Cl. .................................. 123/193.1; 123/193.5
(58) Field of Classification Search .............. 123/188.2, 123/188.8, 193.1, 193.5
See application file for complete search history.

(56) References Cited

FOREIGN PATENT DOCUMENTS

| JP | H5-59975 A | 3/1993 |
|---|---|---|
| JP | 2005-61323 A | 3/2005 |
| JP | 2006-283631 | 10/2006 |
| JP | 2007-255205 A | 10/2007 |

OTHER PUBLICATIONS

Japanese Office Action "Notice of Reasons for Rejection" dated Sep. 6, 2011; Japanese Patent Application No. 2008-001623 with translation.

*Primary Examiner* — Noah Kamen
(74) *Attorney, Agent, or Firm* — Studebaker & Brackett PC; Donald R. Studebaker

(57) ABSTRACT

Disclosed is an internal combustion engine (A), which has a valve overlap period (T) during which an intake valve (1) and an exhaust valve (2) are opened, and a geometric compression ratio of 13.0 or greater. The engine (A) is designed to satisfy, at a center timing (Tc) of the valve overlap period (T), a conditional expression: $S1 \geqq S2$, where S1 is a cross-sectional area of a combustion chamber (4) taken along any selected one of a plurality of mutually parallel hypothetical cutting-planes (IP) each of which extends parallel to a linear reciprocating direction (d1 or d2) of at least one of the intake and exhaust valves (1, 2) and passes through a valve head (1a or 2a) of the at least one of the valves (1, 2), and S2 is an effective opening area defined between the valve head (1a or 2a) and a corresponding valve seat (11a or 12a) in a region on an outward side of the combustion chamber (4) relative to the selected hypothetical cutting-plane (IP). The present invention can reliably improve combusted-gas scavenging efficiency and intake-air charging efficiency.

20 Claims, 6 Drawing Sheets

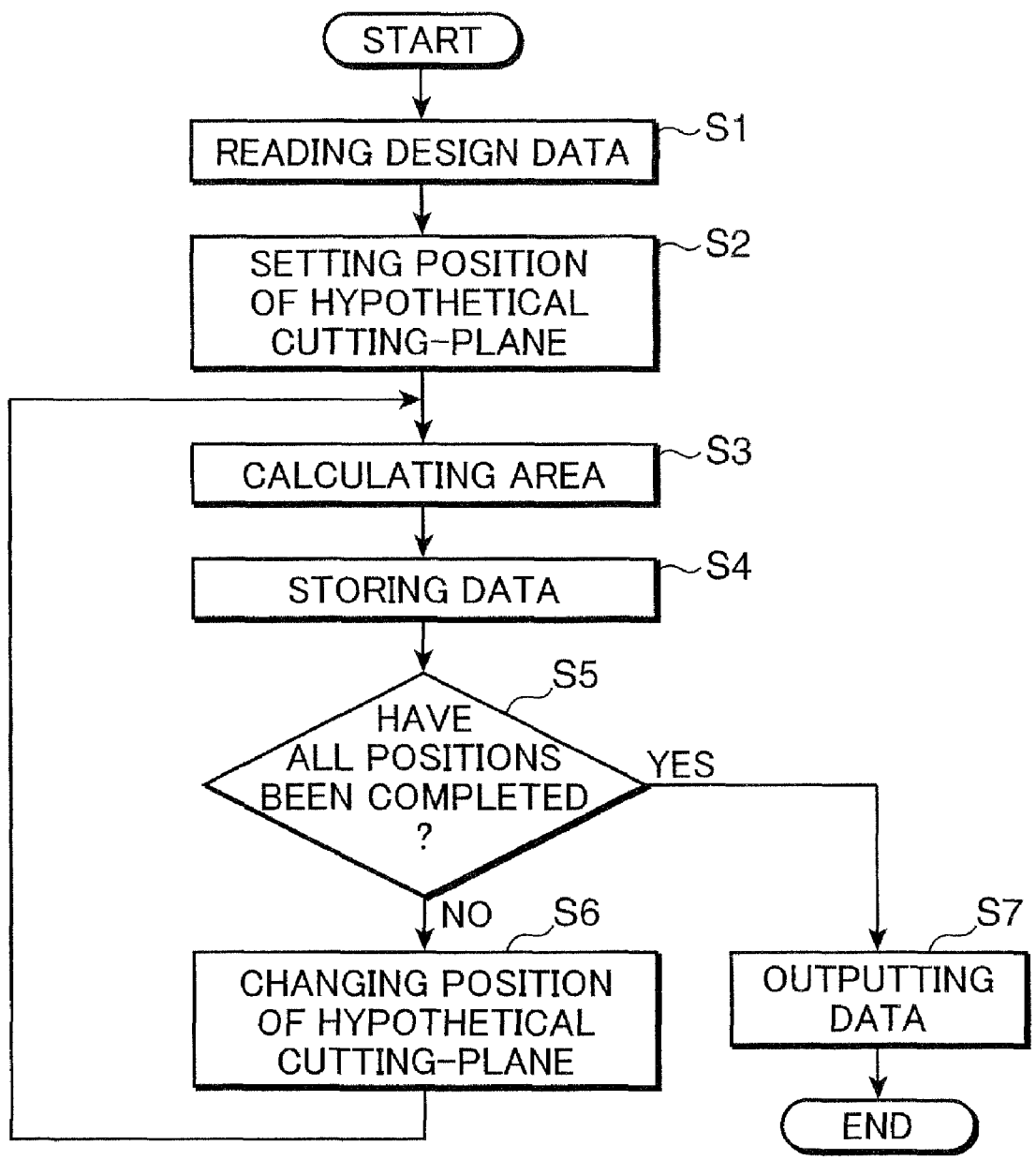

INTERNAL COMBUSTION ENGINE

BACKGROUND OF THE INVENTION

1. Field of the Invention

The present invention relates to a reciprocating internal combustion engine, and particularly to a reciprocating internal combustion engine having a geometric compression ratio of 13.0 or greater.

2. Description of the Background Art

There has been proposed a reciprocating internal combustion engine designed such that valve timings of an intake valve and an exhaust valve are adjusted to have a valve overlap period for allowing both the intake and exhaust valves to be opened at a timing when a piston is located around its top dead center position (see, for example, JP 2006-283631A). Based on setting up the valve overlap period, combusted-gas scavenging efficiency and intake-air charging efficiency can be improved.

In reciprocating internal combustion engines, as a technique for improving fuel economy, it has also been proposed to set a geometric compression ratio at a higher value, e.g., 13 or greater, to improve thermal efficiency. However, given that an engine displacement is constant, as the geometric compression ratio is set at a higher value, a volume of a combustion chamber becomes smaller, which restrict a gas-flow directed in an intake-to-exhaust direction in the combustion chamber. Therefore, if the valve overlap period is set up in an engine having a geometric compression ratio set at a high value, intake and exhaust capacities are not enhanced in proportion to an increase in valve lift amount, resulting in failing to improve combusted-gas scavenging efficiency and intake-air charging efficiency, in some cases. Although a volume of the combustion chamber is increased to remedy this problem, the geometric compression ratio will be reduced. Thus, there is a need for a combustion chamber having a configuration which allows a geometric compression ratio to be set at a higher value while suppressing a resistance to a gas-flow directed in an intake-to-exhaust direction in the combustion chamber.

SUMMARY OF THE INVENTION

In an internal combustion engine having a geometric compression ratio of 13.0 or greater, it is an object of the present invention to more reliably improve combusted-gas scavenging efficiency and intake-air charging efficiency based on setting up a valve overlap period.

In order to achieve this object, the present invention provides an internal combustion engine comprising, a cylinder, a piston which reciprocates within the cylinder, a cylinder head which defines a combustion chamber in cooperation with the cylinder and piston, a spark plug which is provided in the cylinder head, and an intake valve and an exhaust valve each having a valve head which closely contacts with a valve seat of the cylinder head to seal the combustion chamber, wherein the internal combustion engine has a valve overlap period for allowing both the intake and exhaust valves to be opened during the course of a cylinder cycle, and a geometric compression ratio of 13.0 or greater. The internal combustion engine is designed to satisfy, at a center timing of the valve overlap period, a conditional expression: $S1 \geq S2$, where S1 is a cross-sectional area of the combustion chamber taken along any selected one of a plurality of mutually parallel hypothetical cutting-planes each of which extends parallel to a linear reciprocating direction of at least one of the intake and exhaust valves and passes through the valve head of the at least one of the valves, and S2 is an effective opening area defined between the valve head of the at least one of the valves and the corresponding valve seat in a region on an outward side of the combustion chamber relative to the selected hypothetical cutting-plane.

BRIEF DESCRIPTION OF THE DRAWINGS

FIG. 5 is a flowchart showing an example of a processing to be executed by a computer in order to calculate a relationship between an effective opening area and a cross-sectional area of the combustion chamber in each of a plurality of hypothetical cutting-planes.

DESCRIPTION OF THE PREFERRED EMBODIMENTS

Figure 1A:
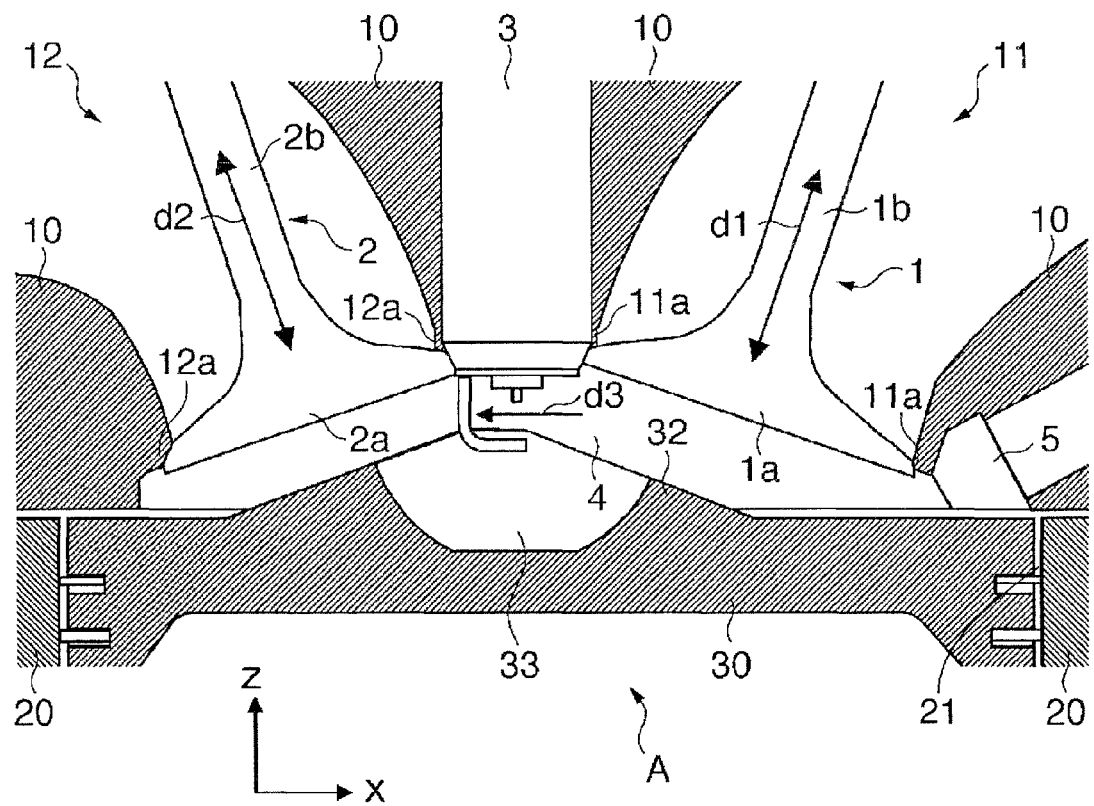
FIG. 1A is a partially vertical sectional view showing a structure around a combustion chamber of an internal combustion engine according to one embodiment of the present invention.
Figure 1B:
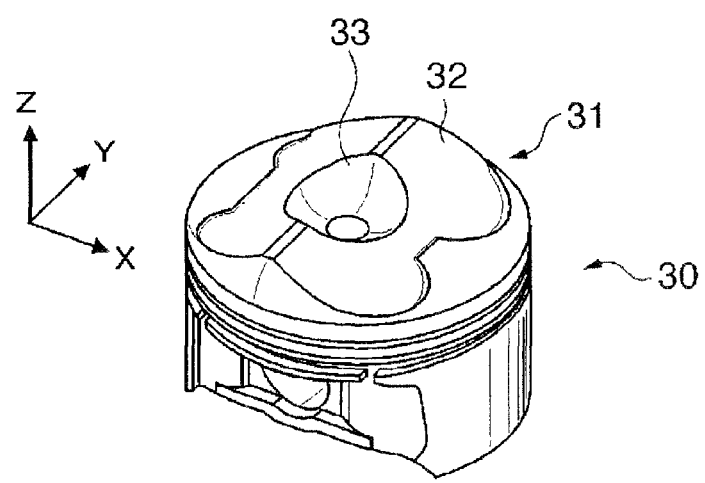
FIG. 1B is a fragmentary perspective view showing a piston of the engine in FIG. 1.

FIG. 1A is a partially vertical sectional view showing a structure around a combustion chamber 4 of an internal combustion engine A according to one embodiment of the present invention, and FIG. 1B is a fragmentary perspective view showing a piston 30 of the engine A. Although the engine A is designed to aim at a four-cycle inline multicylinder gasoline engine, the present invention can also be applied to other type of internal combustion engine. In FIGS. 1A and 1B, Z, Y and X indicate a direction of a linear reciprocating movement of the piston 30, a cylinder arrangement direction (identical to an axial direction of a crankshaft (not shown)) and a direction perpendicular to the cylinder arrangement direction, respectively, wherein a respective two of the Z, Y and X directions intersect with each other at a right angle.

The engine A comprises a cylinder head 10. The cylinder head 10 has, per cylinder, two intake ports 11 and two exhaust ports 12. Each of the intake ports 11 and the exhaust ports 12 is provided with a valve seat (11a or 12a) at an end thereof.

An intake value 1 is provided in each of the intake ports 11, and an exhaust valve 2 is provided in each of the exhaust ports 12. That is, the cylinder head 10 has, per cylinder, two intake valves 1 and two exhaust valves 2. The two intake valves 1 are arranged in the Y direction, and the two exhaust valves 2 are arranged in the Y direction, in such a manner that each of the intake valves 1 is disposed in spaced-apart relation to a respective one of the exhaust valves 2 in the X direction. As above, the two combinations of the intake and exhaust valves 1, 2 arranged in the X direction are substantially symmetrically arranged on opposite sides of the cylinder head 10. Thus, the following description will be made primarily about only one of the two combinations of the intake and exhaust valves 1, 2 for simplifying the explanation.

The intake valves 1 has a valve head 1a adapted to come into close contact with the valve seat 11a to seal the combustion chamber 4, and a valve stem 1b extending upwardly from the valve head 1a. Similarly, the exhaust valve 2 has a valve head 2a adapted to come into close contact with the valve seat 12a to seal the combustion chamber 4, and a valve stem 2b extending upwardly from the valve head 2a. The intake valve 1 is adapted to linearly reciprocate in an axial direction of the valve stem 1b (direction indicated by the arrowed line d1) to open and close the intake port 11, and the exhaust valve 2 is adapted to linearly reciprocate in an axial direction of the valve stem 2b (direction indicated by the arrowed line d2) to open and close the exhaust port 12.

The cylinder head 10 is concaved in the Z direction in a region defining the combustion chamber 4, and provided with a spark plug 3 at a position around a center of the concaved region (at an approximately center of the combustion chamber 4). The spark plug 3 is operable to create a spark so as to ignite an air/fuel mixture in the combustion chamber 4 to cause combustion of the mixture to be initiated. The spark plug 3 is located between the intake valve 1 and the exhaust valve 2.

The cylinder head 10 is also provided with an injector 5 operable to inject fuel into the combustion chamber 4. Although the engine A according to this embodiment is designed to aim at a so-called "direct injection type", the present invention can also be applied to a port injection-type reciprocating engine.

The engine A further comprises a cylinder block 20. The piston 30 is disposed within each of a plurality of cylinders 21 of the cylinder block 20, and adapted to reciprocate in the Z direction according to combustion of an air/fuel mixture in the combustion chamber 4. A linear reciprocating movement of the piston 30 will be converted to a rotational movement of the crankshaft (not shown).

The piston 30 has a top surface 31 with a raised portion 32 which protrudes upwardly in the Z direction. Based on providing the raised portion 32, a geometric compression ratio of the engine A can be set at a higher value. In this embodiment, the region of the cylinder head 10 defining the combustion chamber 4 is concaved in the Z direction, as mentioned above. More specifically, the cylinder head 10 is concaved at a position corresponding to the center of the combustion chamber 4 to a greater depth than at a position where each of the intake valve 1 and the exhaust valve 2 is provided. In conformity to this configuration of the cylinder head 10, the raised portion 32 is formed to gradually protrude upwardly from a lateral part of the piston 30 located under each of the intake valve 1 and the exhaust valve 2 toward a center of the piston 30. Based on forming the raised portion 32 in this manner, a thickness of the combustion chamber 4 in the Z direction can be set to be closer to an even value to prevent deterioration in flame propagation characteristics.

The top surface 31 of the piston 30 also has a cavity 33. Based on providing the cavity 33, a flame propagation in the Z direction which is the movement direction of the piston 30, i.e., a flame propagation directed downwardly from the spark plug 3, can be promoted to improve engine thermal efficiency. In this embodiment, the cavity 33 is located under the spark plug 3. Based on this configuration of the top surface 31 of the piston 30, the flame propagation characteristics can be further improved to facilitate improvement in thermal efficiency of the engine A. Although the cavity 33 in this embodiment is formed in a bowl shape, the cavity 33 is not limited to a specific shape.

In this embodiment, the geometric compression ratio is set at 13.0 or greater. Based on setting the geometric compression ratio at such a high value, the thermal efficiency can be improved to facilitate improvement in fuel economy. The geometric compression ratio is expressed as $(V0+V1)/V1$, wherein V1 is a volume of the combustion chamber in a state when the piston 30 is at its top dead center position, and V0 is an engine displacement (stroke volume). The volume V1 is a so-called "clearance volume", which is a volume of the combustion chamber 4 defined by an inner wall of the cylinder head 10 facing the combustion chamber 4, a surface of a component (the intake and exhaust valves 1, 2 (in their closed state), the spark plug 3 and the injector 5) attached to the cylinder head 10, an inner wall of the cylinder 21 of the cylinder block 20, a surface of the piston 30, and a clearance between the cylinder head 10 and the cylinder block 20, in the state when the piston 30 is at the top dead center position.

Respective valve timings of the intake valve 1 and the exhaust valve 2 will be described below. In this embodiment, the engine A has a valve overlap period for allowing both the intake valve 1 and the exhaust valve 2 to be opened when the piston 30 is located around the top dead center position. At least one of the intake valve 1 and the exhaust valve 2 may be provided with a variable valve timing mechanism to variably control the valve timing thereof.

Figure 2:
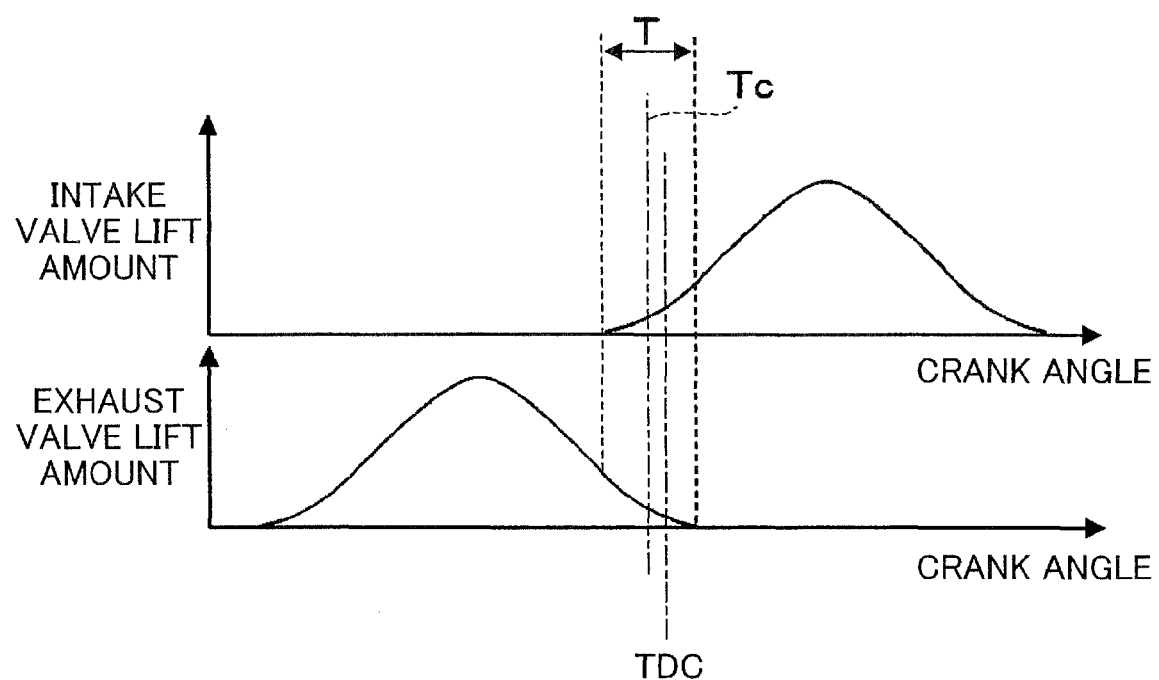
FIG. 2 is an explanatory diagram of a valve overlap period.

FIG. 2 is an explanatory diagram of the valve overlap period. The valve overlap period corresponds to a time-period T in FIG. 2. In FIG. 2, a top dead center (TDC) is a crank angle phase at which the piston 30 is located at its TDC position. Tc indicates a center timing of the valve overlap period T in terms of the crank angle phase. In this embodiment, the center timing Tc is shifted from the TDC phase, specifically shifted in an advance direction.

The overlap period T is set up to primarily aim at improvement in combusted-gas scavenging efficiency and intake-air charging efficiency. Specifically in the overlap period T, combusted gas in the combustion chamber 4 is sucked out from the exhaust port 12 by an action of pulsations of exhaust gas, and accordingly fresh air is sucked into the combustion chamber 4, so that gas flow is created in a direction indicated by the arrowed line d3 in FIG. 1 (direction from the side of the intake valve 1 toward the side of the exhaust valve 2) to allow combusted gas in the combustion chamber 4 to be discharged and replaced with fresh air. Thus, in view of improving combusted-gas scavenging efficiency and intake-air charging efficiency, it is desirable to promote gas flow in the direction of the arrowed line d3.

However, if the geometric compression ratio is set at a relatively high value, a volume of the combustion chamber 4 will become smaller to cause deterioration in gas flow capability in the combustion chamber 4. Particularly, in the configuration where the raised portion 32 is formed on the top surface 31 of a piston 30 as in this embodiment, the gas flow capability in the direction of the arrowed line d3 is likely to deteriorate. Therefore, even if the overlap period is set up, the poor gas flow capability is likely to cause an undesirable situation of failing to improve combusted-gas scavenging efficiency and intake-air charging efficiency. In this situation, even if it is attempt to design an internal combustion engine to satisfy both an increase in geometric compression ratio and an improvement in combusted-gas scavenging efficiency and intake-air charging efficiency, without a criterion for evaluating a gas flow capability, respective configurations of a combustion chamber and a top surface of a piston have to be designed in trial-and-error manner, and thereby design efficiency will significantly deteriorate.

Therefore, in this embodiment, the engine A is designed to satisfy, at the center timing Tc of the valve overlap period T, a condition of $Si1 \geq Si2$, where $Si1$ is a cross-sectional area of the combustion chamber 4 taken along any selected one of a plurality of mutually parallel hypothetical cutting-planes IPi each of which extends parallel to the linear reciprocating direction d1 of the intake valve 1 and passes through the valve head 1a of the intake valve 1, and Si2 is an effective opening area defined between the valve head 1a and the valve seat 11a in a region on an outward side of the combustion chamber 4 relative to the selected hypothetical cutting-plane IPi.

As for a region on the side of the exhaust valve 2, in the same manner, the engine A is designed to satisfy, at the center timing Tc of the valve overlap period T, a condition of Se1≧Se2, where Se1 is a cross-sectional area of the combustion chamber 4 taken along any selected one of a plurality of mutually parallel hypothetical cutting-planes IPe each of which extends parallel to the linear reciprocating direction d2 of the exhaust valve 2 and passes through the valve head 2a of the exhaust valve 2, and Se2 is an effective opening area defined between the valve head 2a and the valve seat 12a in a region on the outward side of the combustion chamber 4 relative to the selected hypothetical cutting-plane IPe.

Even if the engine A is designed to satisfy only either one of the above conditions relating to the intake valve 1 and the exhaust valve 2, it can be expected to achieve an improvement in the combusted-gas scavenging efficiency and intake-air charging efficiency. However, it is preferable that the engine A is designed to satisfy both the conditions relating to the intake and exhaust valves 1, 2 as in this embodiment, in order to further enhance the improvement. In the following description, when the hypothetical cutting-plane IPi and the hypothetical cutting-plane IPe are described with no distinction, each of them will be referred to as "hypothetical cutting-plane IP". In the same manner, when the cross-sectional area Si1 and the cross-sectional area Se1 are described with no distinction, each of them will be referred to as "cross-sectional area S1. When the effective opening area Si2 and the effective opening area Se2 are described with no distinction, each of them will be referred to as "effective opening area S2".

Figure 3:
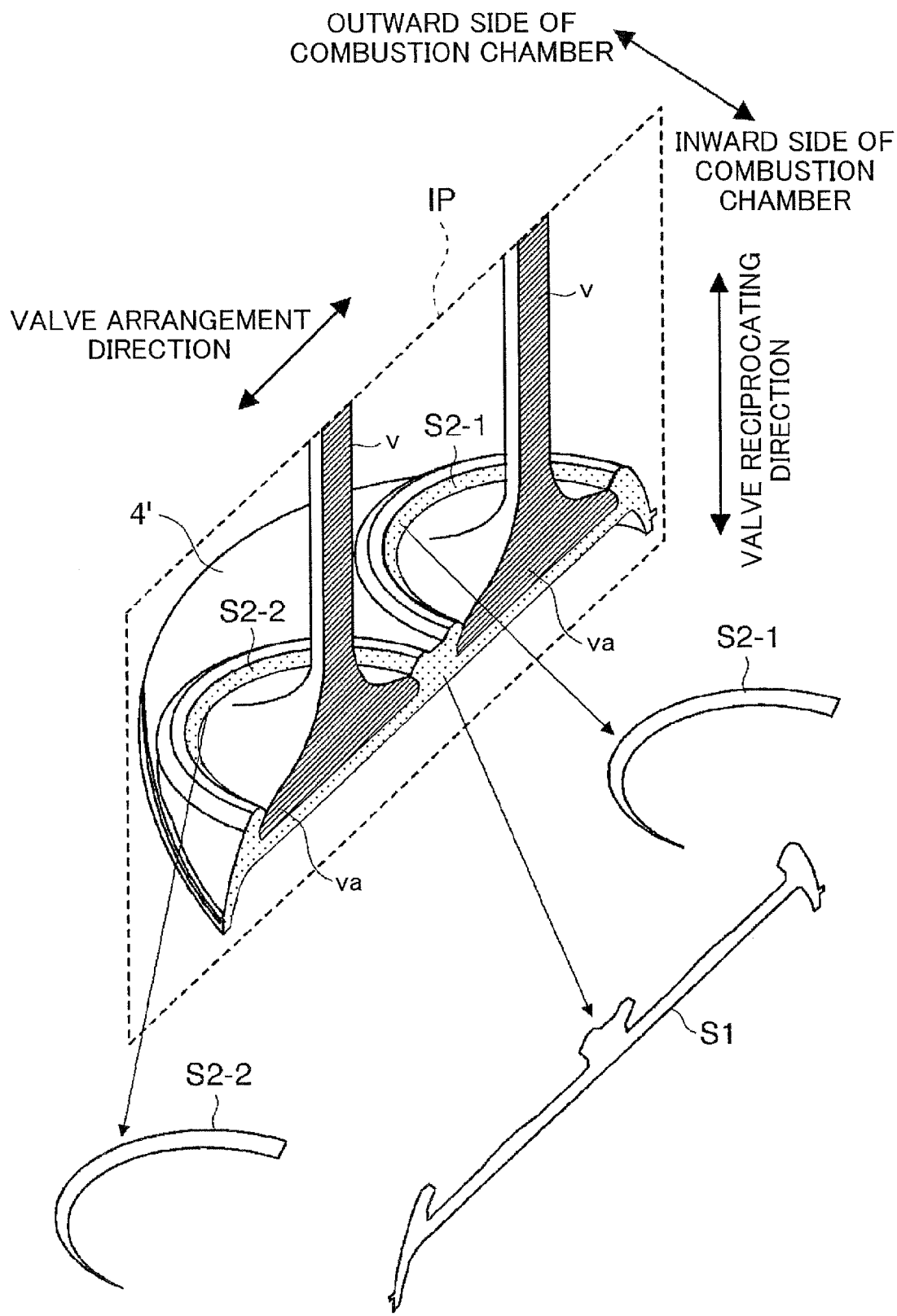
FIG. 3 is an explanatory diagram of a hypothetical cutting-plane, a cross-sectional area of the combustion chamber, and an effective opening area.

FIG. 3 is explanatory diagram of the hypothetical cutting-plane IP, the cross-sectional area S1 and the effective opening area S2. In FIG. 3, a valve v represents each of the two intake valves 1 or each of the two exhaust valves 2, and a combustion chamber 4' represents a three-dimensional configuration of the combustion chamber 4 at the center timing Tc of the valve overlap period T. A valve arrangement direction means an arrangement direction of the two intake valves 1 or the two exhaust valves 2, and corresponds to the Y direction which is the axial direction of the crankshaft (not shown). A valve reciprocating direction means the direction d1 or the direction d2, which is an axial direction of a valve v. Further, as used herein, the term "outward side of the combustion chamber" means an opposite side of the spark plug 3 with respect to the hypothetical cutting-plane IP, and the term "inward side of the combustion chamber" means the side of the spark plug 3 with respect to the hypothetical cutting-plane IP.

The hypothetical cutting-plane IP extends parallel to the valve reciprocating direction and passes through a valve head va (i.e., each of the two valve heads 1a or each of the two valve head 2a) of the valve v. In this embodiment, the hypothetical cutting-plane IP further extends parallel to the valve arrangement direction (or the axial direction of the crankshaft).

Figure 4:
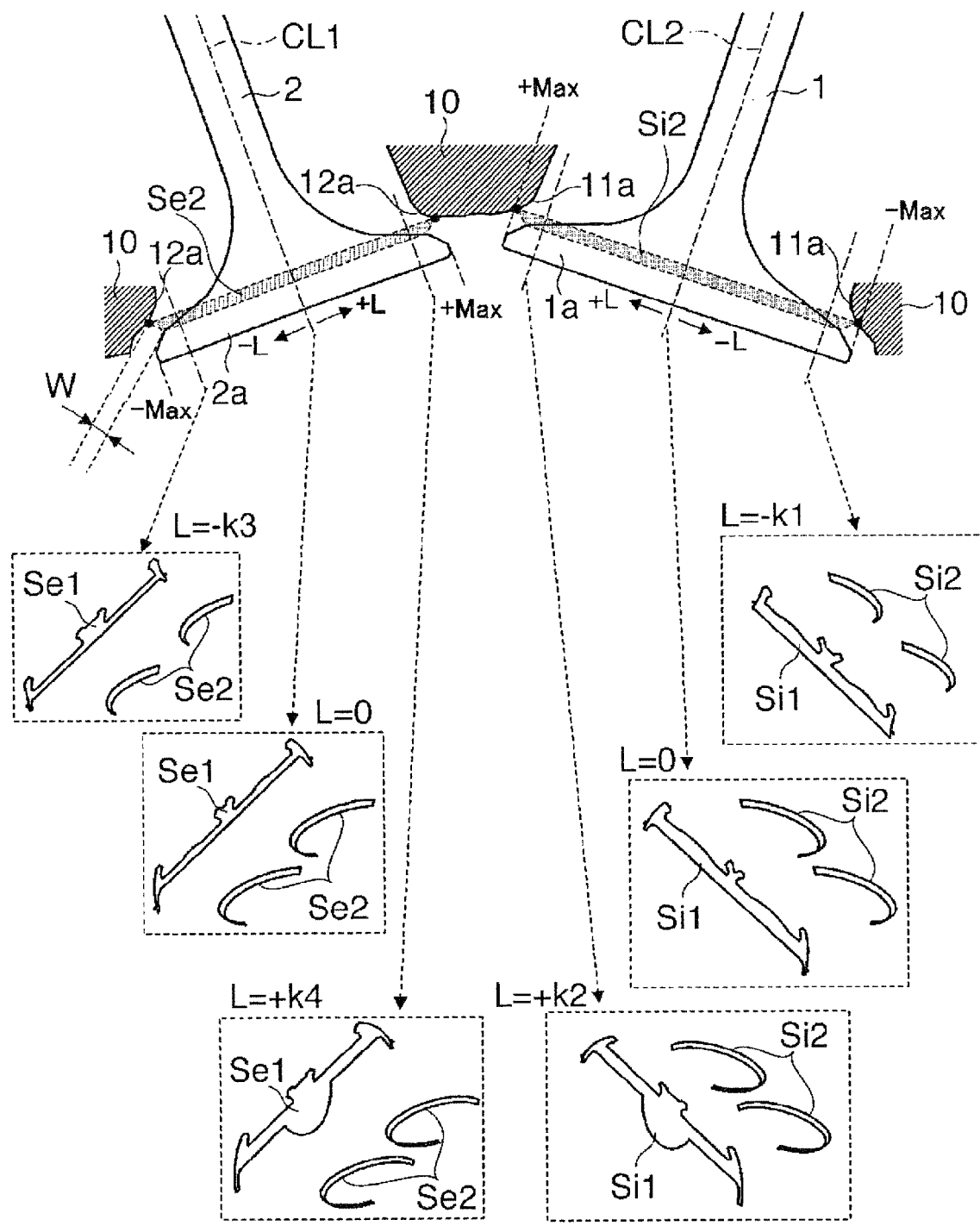
FIG. 4 is an explanatory diagram of the effective opening area and the hypothetical cutting-plane.

The cross-sectional area S1 is an area of a cut surface formed when the combustion chamber 4' is cut by the hypothetical cutting-plane IP. The effective opening area S2 is an opening area defined between the valve head va and the corresponding valve seat (not shown in FIG. 3) in a region of a so-called "curtain area" on the outward side of the combustion chamber 4 relative to the hypothetical cutting-plane IP. More specifically, as shown in FIG. 4, the effective opening area S2 is an area defined by a gap width W, an inner circumference of the valve seat (11a or 12a) and an outer circumference of the corresponding valve head (1a or 2a), wherein the gap width W is a minimum one of a gap between the valve seat 11a and the valve head 1a of the intake valve 1 and a gap between the valve seat 12a and the valve head 2a of the exhaust valve 2. Each of the inner circumference and the outer circumference is a partial circumference extending from each of two intersecting point with the hypothetical cutting-plane IP toward the outward side of the combustion chamber 4.

In the internal combustion engine having the two intake valves 1 (two valves v) and the two exhaust valves 2 (two valves v) as in this embodiment, a total of an effective opening area S2-1 of one of the valves v and an effective opening area S2-2 of the other valves v is used as the effective opening area S2, as shown in FIG. 3.

When gas flow is created in the combustion chamber 4 in the direction of the arrowed line d3 in FIG. 1, gas which flows between the intake port 11 and the exhaust port 12 via a region having the effective opening area S2-1 and S2-2 (gap between the valve head va and the corresponding valve seat) passes through a region corresponding to the cross-sectional area S1 in FIG. 3. Thus, if the cross-sectional area S1 and the effective opening area S2 has a relation of S1<S2, the region having the cross-sectional area S1 will restrict gas flow, i.e., will resist gas flow directed in the direction of the arrowed line d3 in FIG. 1 in the combustion chamber 4.

In contrast, when the above condition of S1≧S2 is satisfied, a gas-passage area (S1) at least equal to a gas-passage area (S2) for allowing gas to pass through the gaps between respective ones of the valve heads va and the corresponding valve seats is ensured in the combustion chamber 4. This makes it possible to suppress a gas-flow resistance (i.e., resistance to gas flow) in the combustion chamber 4. Although only one hypothetical cutting-plane IP is shown in FIG. 3, the engine A may be designed to satisfy the condition of S1≧S2 in a plurality of mutually parallel hypothetical cutting-planes IP so as to suppress a gas-flow resistance over a wide range of the combustion chamber 4. The plurality of hypothetical cutting-planes IP are arranged side by side in a direction perpendicular thereto and at any positions in a radial direction of the valve head va. If the condition of S1≧S2 is satisfied in each of the hypothetical cutting-planes IP, the gas-flow resistance can be suppressed over the entire combustion chamber 4.

In this embodiment, the hypothetical cutting-plane IP extends parallel to the valve arrangement direction (i.e., the axial direction of the crankshaft) and in a direction approximately perpendicular to the gas flow direction d3 in the combustion chamber 4. This makes it possible to realistically ensure the gas-passage area in the combustion chamber 4 in conformity to an amount of gas to be charged and discharged.

It can be considered that the effect of improving combusted-gas scavenging efficiency and intake-air charging efficiency is maximized at the center timing Tc of the valve overlap period T. Thus, the engine A can be designed to satisfy the condition of S1≧S2 at least at the center timing Tc of the valve overlap period T, to more reliably improve combusted-gas scavenging efficiency and intake-air charging efficiency, while ensuring a certain level of flexibility in design of a combustion chamber configuration for increasing the geometric compression ratio.

In this embodiment, the center timing Tc is shifted from a timing when the piston 30 is located at the TDC position. This makes it possible to facilitate ensuring the gas-passage area in the combustion chamber 4 and improve combusted-gas scavenging efficiency and intake-air charging efficiency.

Further, if the geometric compression ratio is increased up to 13.0 or greater, the gas-flow resistance in the combustion chamber 4 is generally likely to occur. Thus, the configuration satisfying the condition of S1≧S2 is effective to improve combusted-gas scavenging efficiency and intake-air charging efficiency, in the engine having a geometric compression ratio of 13.0 or greater. If the geometric compression ratio is increased up to 14.0 or greater, or 14.5 or greater, the gas-flow resistance in the combustion chamber 4 is more likely to occur. Thus, the configuration satisfying the condition of S1≧S2 is particularly effective to improve combusted-gas scavenging efficiency and intake-air charging efficiency, in the engine having a geometric compression ratio falling within such a range.

One example of a process of designing an internal combustion engine on a computer using, as indexes, the hypothetical cutting-plane IP, the cross-sectional area S1 and the effective opening area S2, will be described below.

FIG. 5 is a flowchart showing an example of a processing to be executed by a computer in order to calculate a relationship between a cross-sectional area S1 and an effective opening area S2 in each of a plurality of hypothetical cutting-planes IP.

In Step S1, design data about engine components defining a combustion chamber 4 is read. For example, each of the components and the combustion chamber 4 is defined by a three-dimensional solid model, and a coordinate of the solid model is set correspondingly to the center timing Tc of the valve overlap period T.

In Step S2, a first position of a selected one of the hypothetical cutting-planes IP is set based on the design date read in Step S1. In Step S3, a cross-sectional area S1 and an effective opening area S2 at the position of hypothetical cutting-plane IP set in Step S2 are calculated. In Step S4, an obtained calculation result is stored. In Step S5, it is determined whether the operations in Steps S3 and S4 have been completed for all of a plurality of positions pre-determined as respective positions of the plurality of hypothetical cutting-planes IP. If YES, the routine advances to Step S7. If NO, the routine advances to Step S6.

In Step S6, the position of the hypothetical cutting-plane IP is changed, and the routine is returned to Step S3. Then, the operations in Steps S3 to S6 will be repeated until Steps S3 and S4 have been completed for all the positions. Further, the above operations are performed for both an intake side and an exhaust side.

With reference to FIG. 4, one example of an operation of setting a position (particularly, a coordinate) of each of a plurality of hypothetical cutting-planes IP will be described below. Firstly, a central axis CL1 (or CL2) of the intake valve 1 (or the exhaust valve 2) is set to be an origin (=0). Then, an inward side of the combustion chamber and an outward side of the combustion chamber, relative to the central axis CL1 (or CL2) in a direction perpendicular to the hypothetical cutting-plane IP, are defined as + side and − side, respectively, and the position of each of the hypothetical cutting-planes IP is defined by a distance L from the central axis CL1 (or CL2). A maximum value (+Max in FIG. 4) of the +L and a minimum value (−Max in FIG. 4) of the −L are set based on a radius of the valve head 1a (or 2a) of the intake valve 1 (or the exhaust valve 2). The distance L is set to a plurality of values in the range of zero to +Max and in the range of zero to −Max.

FIG. 4 shows a cross-sectional area S1 and an effective opening area S2 in one example where the plurality of hypothetical cutting-planes IP are set at three positions (L=0, −k1 and +k2) on the intake side and at three positions (L=0, −k3 and +k4) on the exhaust side. As seen in FIG. 4, the effective opening area S2 becomes smaller as the distance L is gradually changed toward the − side, and becomes larger as the distance L is gradually changed toward the + side. The cross-sectional area S1 becomes smaller as the distance L is gradually carried toward the − side, and becomes larger as the distance L is gradually changed toward the + side, in the same manner as that in the effective opening area S2. In this embodiment, the cavity 33 exists on the top surface 31 of the piston 30. Thus, the cross-sectional area S1 becomes larger as the distance L is gradually changed toward the + side, by a cross-section of the cavity 33.

Figure 6A:
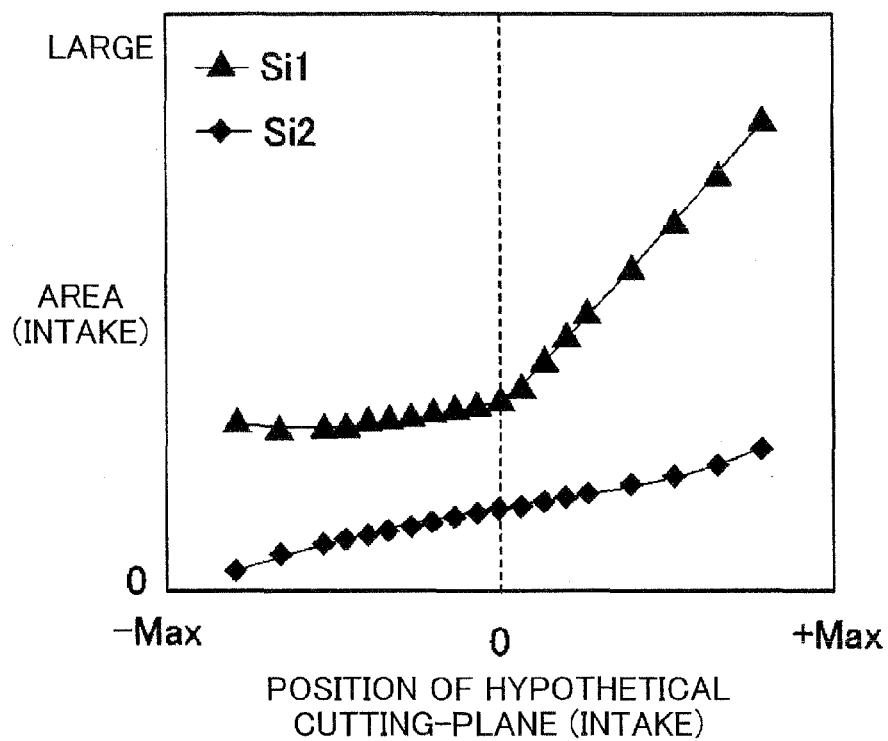
FIGS. 6A and 6B are graphs showing an example of an output of a calculation result on the effective opening area and the cross-sectional area of the combustion chamber in each of the hypothetical cutting-planes.
Figure 6B:
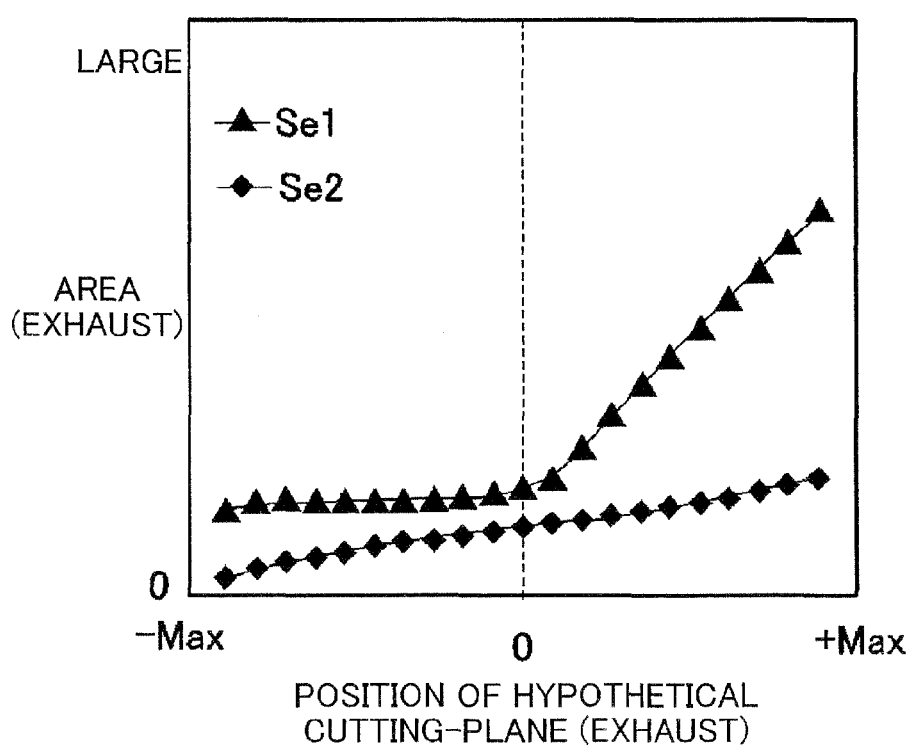

Returning to FIG. 5, in Step S7, the calculated result is output to a display or the like. FIG. 6A shows one example of a calculation result of the intake side, and FIG. 6B shows one example of a calculation result of the exhaust side. In FIGS. 6A and 6B, plots indicate cross-sectional areas S1 and effective opening areas S2 at respective position of a plurality of hypothetical cutting-planes IP (In FIG. 6A (intake side), nineteen positions, and in FIG. 6B (exhaust side), twenty-one position). In the example in FIG. 6A, Si1 is greater than Si2 at all the positions of the hypothetical cutting-planes IP. In the example in FIG. 6B, Se1 is greater than Se2 at all the positions of the hypothetical cutting-planes IP. Thus, these results verify an excellent capability to improve combusted-gas scavenging efficiency and intake-air charging efficiency.

If the cross-sectional area S1 is less than the effective opening area S2 at one or more of the positions, an engineer (user) will decide to redesign one or more of the components. While any of the components defining the combustion chamber 4 may be selected as a target for the redesign, it is convenient to select the piston 30 in view of flexibility in design. In this case, the engineer can figure out a position where the condition of S1≧S2 is not satisfied, based on the calculation results in FIGS. 6A and 6B. For example, the redesign may be performed by changing a configuration of the top surface 31 of the piston 31 at the position, e.g., by concaving the top surface 31 at the position. Although the geometric compression ratio is reduced due to the concaving, the top surface 31 of the piston 30 may be raised at another position where the condition of S1≧S2 is satisfied, to avoid reduction in geometric compression ratio.

Based on performing the above processing on a computer, a certain level of presumption of improvement in combusted-gas scavenging efficiency and intake-air charging efficiency during the valve overlap period can be made without repeating a process of preparation of trial models→actual test→redesign, to effectively perform design activities.

The features and advantages of the present invention disclosed based on the above embodiment will be summarized by way of conclusion.

An internal combustion engine of the present invention comprises a cylinder, a piston which reciprocates within the cylinder, a cylinder head which defines a combustion chamber in cooperation with the cylinder and piston, a spark plug which is provided in the cylinder head, and an intake valve and an exhaust valve each having a valve head which closely contacts with a corresponding valve seat of the cylinder head to seal the combustion chamber, wherein the internal combustion engine has a valve overlap period for allowing both the intake and exhaust valves to be opened during the course of a cylinder cycle, and a geometric compression ratio of 13.0 or greater. The internal combustion engine is designed to satisfy, at a center timing of the valve overlap period, a conditional expression: S1≧S2, where S1 is a cross-sectional area of the combustion chamber taken along any selected one of a plurality of mutually parallel hypothetical cutting-planes each of which extends parallel to a linear reciprocating direction of at least one of the intake and exhaust valves and passes through the valve head of the at least one of the valves, and S2 is an effective opening area defined between the valve head of the at least one of the valves and the corresponding valve seat in a region on an outward side of the combustion chamber relative to the selected hypothetical cutting-plane.

In the internal combustion engine of the present invention, the above condition of S1≧S2 is satisfied, so that a gas-passage area at least equal to a gas-passage area for allowing gas to pass through a gap between the valve head of the intake or exhaust valve and the corresponding valve seat is ensured in the combustion chamber. This makes it possible to suppress a gas-flow resistance in the combustion chamber.

It can be considered that an effect of improving combusted-gas scavenging efficiency and intake-air charging efficiency is maximized at the center timing of the valve overlap period. Thus, the engine can be designed to satisfy the condition of S1≧S2 at least at the center timing of the valve overlap period, to more reliably improve combusted-gas scavenging efficiency and intake-air charging efficiency, while ensuring a certain level of flexibility in design of a combustion chamber configuration for increasing the geometric compression ratio.

Preferably, the internal combustion engine of the present invention is designed in such a manner that the conditional expression is applied to both the intake valve and the exhaust valve. This makes it passable to more effectively improve combusted-gas scavenging efficiency and intake-air charging efficiency.

Preferably, in the internal combustion engine of the present invention, each of the hypothetical cutting-planes is set to extend in a direction approximately perpendicular to a direction of gas flow during the valve overlap period. This makes it possible to realistically ensure a gas-passage area in the combustion chamber in conformity to an amount of gas to be charged and discharged.

Each of the hypothetical cutting-planes may be set to extend in the above direction in the following specific manner.

When the number of the intake valves is two per cylinder, each of the hypothetical cutting-planes may be set to extend parallel to an arrangement direction of the two intake valves. Further, when the number of the exhaust valves is two per cylinder, each of the hypothetical cutting-planes may be set to extend parallel to an arrangement direction of the two exhaust valves.

When each of the intake valves is disposed in spaced-apart relation to a respective one of the exhaust valves in a direction perpendicular to an axial direction of a crankshaft of the internal combustion engine, each of the hypothetical cutting-planes may be set to extend parallel to the axial direction of the crankshaft.

Preferably, in the internal combustion engine of the present invention, the piston has a top surface with a raised portion which gradually protrudes upwardly from a lateral part of the piston located under each of the intake and exhaust valves towards a center of the piston. This makes it possible to improve flame propagation characteristics while increasing the geometric compression ratio.

In the internal combustion engine of the present invention, the center timing is preferably shifted from a timing when the piston is located at its top dead center position, more preferably shifted from the timing when the piston is located at the top dead center position, in advance direction. This makes it possible to facilitate ensuring a gas-passage area in the combustion chamber, and improve combusted-gas scavenging efficiency and intake-air charging efficiency.

Preferably, the internal combustion engine of the present invention preferably has a geometric compression ratio of 14.0 or greater, or 14.5 or greater. Based on the increased geometric compression ratio, thermal efficiency can be improved.

This application is based on Japanese Patent application serial No. 2008-001623 filed in Japan Patent Office on Jan. 8, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An internal combustion engine comprising:
   a cylinder;
   a piston which reciprocates within said cylinder;
   a cylinder head which defines a combustion chamber in cooperation with said cylinder and piston;
   a spark plug which is provided in said cylinder head; and
   an intake valve and an exhaust valve each having a valve head which closely contacts with a corresponding valve seat of said cylinder head to seal said combustion chamber, wherein:
   said internal combustion engine has a valve overlap period for allowing both said intake and exhaust valves to be opened during the course of a cylinder cycle, and a geometric compression ratio of 13.0 or greater, said internal combustion engine being designed to satisfy, at a center timing of said valve overlap period, a conditional expression: $S1 \geq S2$, where:
   S1 is a cross-sectional area of said combustion chamber taken along any selected one of a plurality of mutually parallel hypothetical cutting-planes each of which extends parallel to a linear reciprocating direction of at least one of said intake and exhaust valves and passes through the valve head of said at least one of said valves; and
   S2 is an effective opening area defined between the valve head of said at least one of said valves and the corresponding valve seat in a region on an outward side of said combustion chamber relative to said selected hypothetical cutting-plane.

2. The internal combustion engine as defined in claim 1, which is designed in such a manner that said conditional expression is applied to both said intake valve and said exhaust valve.

3. The internal combustion engine as defined in claim 2, wherein each of said hypothetical cutting-planes is set to extend in a direction approximately perpendicular to a direction of gas flow during said valve overlap period.

4. The internal combustion engine as defined in claim 3, wherein the number of said intake valves is two per cylinder, and each of said hypothetical cutting-planes is set to extend parallel to an arrangement direction of said two intake valves.

5. The internal combustion engine as defined in claim 4, wherein the number of said exhaust valves is two per cylinder, and each of said hypothetical cutting-planes is set to extend parallel to an arrangement direction of said two exhaust valves.

6. The internal combustion engine as defined in claim 5, wherein:
   each of said intake valves is disposed in spaced-apart relation to a respective one of said exhaust valves in a direction perpendicular to an axial direction of a crankshaft of said internal combustion engine; and each of said hypothetical cutting-planes is set to extend parallel to the axial direction of said crankshaft.

7. The internal combustion engine as defined in claim 6, wherein said piston has a top surface with a raised portion which gradually protrudes upwardly from a lateral part of said piston located under each of said intake and exhaust valves towards a center of said piston.

8. The internal combustion engine as defined in claim 7, wherein said center timing is shifted from a timing when said piston is located at its top dead center position.

9. The internal combustion engine as defined in claim 8, wherein said center timing is shifted from the timing when said piston is located at the top dead center position, in advance direction.

10. The internal combustion engine as defined in claim 9, which has a geometric compression ratio of 14.0 or greater.

11. The internal combustion engine as defined in claim 9, which has a geometric compression ratio of 14.5 or greater.

12. The internal combustion engine as defined in claim 3, wherein:
    said intake valve is disposed in spaced-apart relation to said exhaust valve in a direction perpendicular to an axial direction of a crankshaft of said internal combustion engine; and
    each of said hypothetical cutting-planes is set to extend parallel to the axial direction of said crankshaft.

13. The internal combustion engine as defined in claim 12, wherein said piston has a top surface with a raised portion which gradually protrudes upwardly from a lateral part of said piston located under each of said intake and exhaust valves towards a center of said piston.

14. The internal combustion engine as defined in claim 13, wherein said center timing is shifted from a timing when said piston is located at its top dead center position.

15. The internal combustion engine as defined in claim 14, wherein said center timing is shifted from the timing when said piston is located at the top dead center position, in advance direction.

16. The internal combustion engine as defined in claim 1, wherein each of said hypothetical cutting-planes is set to extend in a direction approximately perpendicular to a direction of gas flow during said valve overlap period.

17. The internal combustion engine as defined in claim 16, wherein the number of said intake valves is two per cylinder, and each of said hypothetical cutting-planes is set to extend parallel to an arrangement direction of said two intake valves.

18. The internal combustion engine as defined in claim 17, wherein the number of said exhaust valves is two per cylinder, and each of said hypothetical cutting-planes is set to extend parallel to an arrangement direction of said two exhaust valves.

19. The internal combustion engine as defined in claim 18, wherein:
    each of said intake valves is disposed in spaced-apart relation to a respective one of said exhaust valves in a direction perpendicular to an axial direction of a crankshaft of said internal combustion engine; and
    each of said hypothetical cutting-planes is set to extend parallel to the axial direction of said crankshaft.

20. The internal combustion engine as defined in claim 19, wherein said piston has a top surface with a raised portion which gradually protrudes upwardly from a lateral part of said piston located under each of said intake and exhaust valves towards a center of said piston.

* * * * *